No. 734,369. PATENTED JULY 21, 1903.
C. F. RODDE.
MEANS FOR TRANSMISSION OF MOTION OF ROTATING PARTS.
APPLICATION FILED NOV. 24, 1899.
NO MODEL.
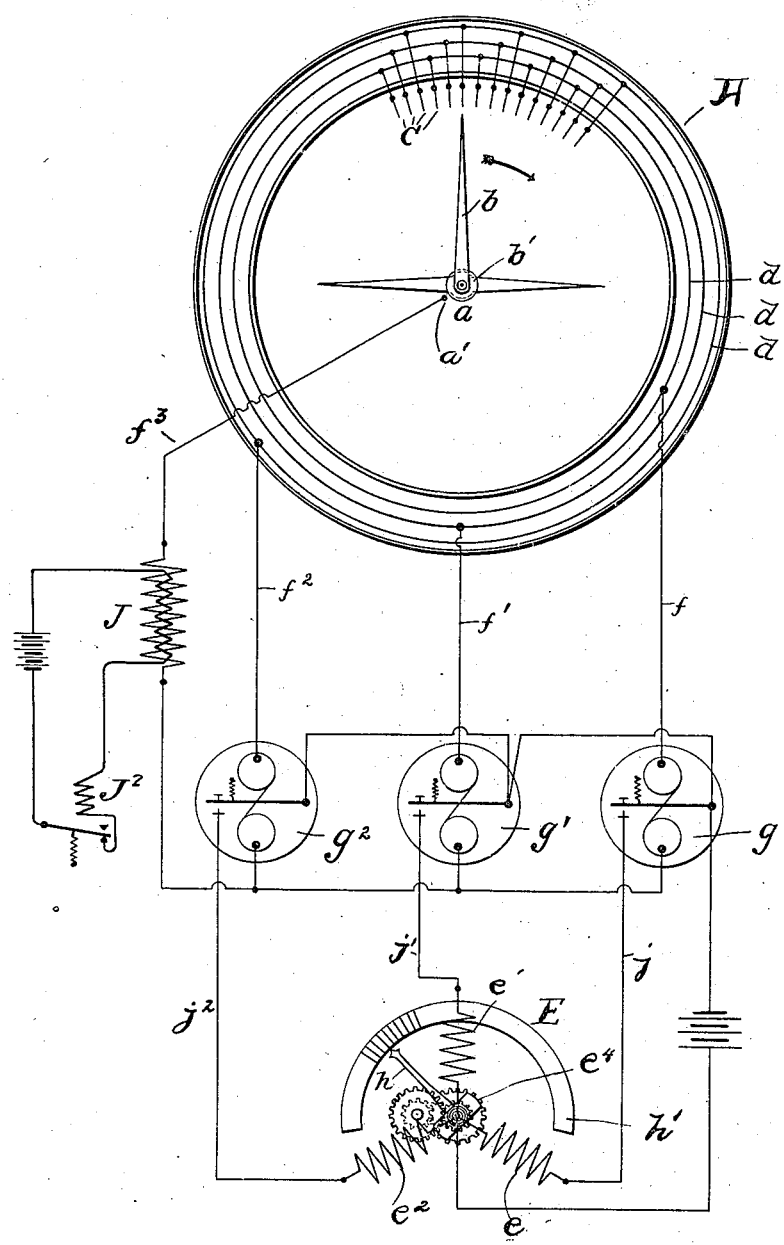

No. 734,369. Patented July 21, 1903.

UNITED STATES PATENT OFFICE.

CARL FRIEDRICH RODDE, OF BERLIN, GERMANY, ASSIGNOR TO SIEMENS & HALSKE ELECTRIC COMPANY OF AMERICA, OF CHICAGO, ILLINOIS, A CORPORATION OF ILLINOIS.

MEANS FOR TRANSMISSION OF MOTION OF ROTATING PARTS.

SPECIFICATION forming part of Letters Patent No. 734,369, dated July 21, 1903.

Application filed November 24, 1899. Serial No. 738,162. (No model.)

*To all whom it may concern:*

Be it known that I, CARL FRIEDRICH RODDE, engineer, a subject of the German Emperor, residing at Berlin, Kingdom of Prussia, Germany, have invented a certain new and useful Improvement in Means for Transmission of Motion of Rotating Parts, of which the following is a full, clear, concise, and exact description, reference being had to the accompanying drawing, forming a part of this specification.

My invention relates to apparatus by which a rotary motion can be transmitted from one point to another.

In the accompanying drawing the figure is a diagrammatic view of an apparatus embodying my invention.

In the drawing I have shown for the purposes of illustrating my invention a compass A, having a needle carrying a pointer $b$, whose rotary motion is to be transmitted to a distance. It will be understood that this is merely illustrative of the operation of the invention, the invention being applicable to any suitable apparatus in which it is desired to transmit rotary motion. The compass A is provided with a series of points $c\ c\ c$, which are arranged in annular order near the outer circumference of the face of the compass, so that as the pointer $b$ on the magnetic needle moves or rotates it will pass by the various points $c\ c\ c$ one after another. The compass A is provided with a plurality of circumferentially-arranged conductors $d\ d'\ d^2$, to which the points $c\ c\ c$ are electrically connected, each third point $c$ being connected to the conductor $d$ and the two intervening points $c\ c$ between each third point being connected with the conductors $d'$ and $d^2$, respectively. The compass is further provided with a metallic point $a'$ and the compass-needle with a circular metallic plate $b'$, the contact or terminal $a'$ being situated a short distance from the periphery of the plate $b'$, so that a small air-gap $a$ is formed between the contact or terminal $a'$ and the periphery of the plate $b'$ irrespective of the position of the needle.

From the compass A are led three conductors $f\ f'\ f^2$, which are understood to extend to the distant point to which the rotary motion of the compass-needle is to be transmitted. These three conductors $f\ f'\ f^2$ are connected with the ring conductors $d\ d'\ d^2$, respectively. A fourth conductor $f^3$ extends from the terminal $a'$ of the compass also to the distant point or station which is to receive the transmission. This conductor $f^3$ includes the secondary of an induction apparatus J, which apparatus is understood to be continually operated by using an interrupted constant current.

$J^2$ represents a circuit-interrupter in the primary circuit of said induction apparatus.

At the receiving-station are located three relays $g\ g'\ g^2$, which are connected with the conductors $f\ f'\ f^2$, respectively, and with the conductor $f^3$, so that these relays are, in effect, included in the three transmitting-circuits extending between the transmitting and receiving stations. The relays $g$, $g'$, and $g^2$ are arranged to close local circuits $j\ j'\ j^2$, which extend to a motor E. This motor E is a well-known type of motor in which there are a plurality of fields each actuated or energized by a different circuit. The drawing illustrates this motor diagrammatically and shows three coils $e\ e'\ e^2$, which are included in the three local circuits $j\ j'\ j^2$, extending from the relays $g\ g'\ g^2$, respectively. The motor is provided with an armature $e^4$, which is geared to or otherwise connected with a pointer $h$, whose outer end travels around an annular ring-dial $h'$, the said pointer $h$ serving to indicate the position of the compass-needle.

The size of the sparking gap $a$ and the distance between the end of the pointer $b$ and the points $c$ are such that the spark induced by the break in the induction-coil can jump across it, whereas the spark produced at make in the coil cannot jump across.

The operation of the apparatus is that as the magnetic needle of the compass A is moved in one direction or the other and as its end comes opposite one of the points $c$ an intermittent unidirectional current will flow through the circuit including the conductor $f^3$, due to the fact that the impulses of the current at break are sufficiently strong to span both the gap $a$ and the gap between the end of the pointer and the particular point $c$ opposite the same, while the reverse impulses—that is, those made at make—are unable to jump both gaps, and hence are suppressed. This current energizes the actuating-coils of the relay included in the transmitting-circuit connected with such point $c$, and thereby actuates said relay and causes it to close its local circuit. When this local circuit is closed, the corresponding field of the motor E is energized, thereby causing the armature of the motor to move, and thereby swing the pointer $h$. The connections and arrangements are such that the pointer $h$ is swung in a direction corresponding to the direction in which the magnetic needle is moved and to an extent proportional to and preferably corresponding to the extent of movement on the part of the magnetic needle. For instance, suppose the magnetic needle occupies the position shown in the drawing the unidirectional current will pass in the ring conductor $d^2$, thence in the transmitting-conductor $f^2$, and through the relay $g^2$, and over the common return-conductor $f^3$, thereby energizing the relay $g^2$. This causes the closure of the local circuit $j^2$, including the coil $e^2$. This will energize the field of this coil and will cause the attraction toward it of the adjacent end of the armature $e^4$, thereby rotating such armature and swinging the indicator $h$ in the direction corresponding to and to an extent proportional to and preferably corresponding to the direction and extent of movement on the part of the magnetic needle of the compass A. The current will continue to flow as long as the pointer $b$ keeps opposite such point $c$; but as the pointer moves and comes opposite another point $c$ circuit through it will be in effect closed in the same way, with the result that a unidirectional current will flow through this second circuit. If the pointer moves in the direction shown by the arrow in the drawing, such current will flow through the circuit including the ring conductor $d$. This will energize the relay $g$ and cause it to close the local circuit including the coil $e$. The energization of the field of this coil $e$ will cause the upper right-hand portion of the armature $e^4$ to be attracted toward the coil $e$, thereby causing the armature to rotate and the indicator $h$ to swing in the direction corresponding to and to an extent proportional to and preferably corresponding to that of the compass-needle. This action, it will be seen, will be produced irrespective of the direction of movement of the compass-needle or the extent of such movement.

It will thus be seen that by my apparatus I utilize the current induced in the secondary of a Ruhmkorff coil by the breakage of the primary circuit of said coil for transmitting purposes and render of no effect the counter-current induced by the make or closure of the primary circuit, which would ordinarily counteract the effect of the current induced at break.

What I claim as my invention is—

1. Mechanism for transmitting rotary motion comprising a rotary member, a plurality of circuits, means for impressing upon one of said circuits dependent upon the position of the rotary member, oppositely-directioned currents of different potentials, means for suppressing the currents in one direction, and mechanism for translating the resulting unidirectional current into rotary motion proportional to the movement of said rotary member, substantially as set forth.

2. Mechanism for transmitting motion, comprising a rotary member, a plurality of circuits, means for impressing upon one of said circuits depending upon the position of the rotary member, oppositely-directioned currents of different potentials, means for suppressing the low-tension current impulses, and mechanism for translating the resulting unidirectional current into rotary motion proportional to the movement of said rotary member, substantially as described.

3. Mechanism for transmitting rotary motion, comprising a rotatable member, a plurality of circuits, an induction-coil, means for impressing the oppositely-directioned currents of different potential of the induction-coil upon said circuits depending upon the position of the rotatable member, terminals connected respectively to said circuits, air-spaces between said rotatable member and said terminals adapted to permit the passage of the high-potential currents and to suppress the low-potential ones, and means for translating the resulting unidirectional current into a rotary motion proportional to the motion of said rotatable member.

4. The combination with a rotary member, of a plurality of circuits having the terminals located so that the rotary member comes opposite them in its rotation, an induction-coil which is connected so that its currents are impressed upon one of said circuits depending upon the position of the rotary member, air-spaces adapted to permit the passage of the high-potential currents of the induction-coil and to suppress the low-potential ones, and means for translating the unidirectional currents thus produced into rotary motion, substantially as described.

5. The combination of a rotary member having a point, a series of terminals arranged in annular order near the path of travel of said point so as to lie opposite and near to the same but separated therefrom by air-spaces, a plurality of circuits with which said terminals are connected, the successive terminals being connected with the different circuits, an induction-coil connected with said point through the medium of an air-gap which is of such size that the low-potential currents of the induction-coil are unable to span both it and the gap between the point and the terminals but which is adapted to permit the high-potential currents to pass, and means for translating the resulting unidirectional currents into rotary motion, substantially as described.

6. The combination with a rotary member provided with a point, of a series of terminals arranged in annular order about the path of travel of said point and in such position that an air-space intervenes between the terminals and the point as the latter passes the former, an induction apparatus connected with said rotary member through the medium of an air-gap which is of such size that the high-potential currents from the induction apparatus can span both it and the space between the point and the terminals but which together with said space between the terminals and point cannot be spanned by the low-potential currents, a plurality of conductors with which said conductors are connected, successive terminals being connected with the different conductors and each of said conductors being connected with the induction apparatus, a plurality of relays one included in each of the circuits including said conductors, a plurality of local circuits each associated with and closed by one of said relays, a motor, and local circuits for operating the motor by the agency of said relays, substantially as described.

7. The combination with the needle of a compass, of a metallic point fastened thereto and movable therewith, a series of terminals arranged in annular order in the path of travel of said point, each of said terminals being separated from said point by an air-gap as the said point passes it, a plurality of circuits with which said terminals are connected, means for impressing upon the circuits a current of sufficiently high potential to jump said air-gap, and means operatively connected to said circuits for indicating the position of said compass-needle.

In witness whereof I hereunto subscribe my name this 31st day of August, A. D. 1899.

CARL FRIEDRICH RODDE.

Witnesses:
WOLDEMAR HAUPT,
HENRY HASPER.